United States Patent [19]

Nakai et al.

[11] Patent Number: 4,504,133
[45] Date of Patent: * Mar. 12, 1985

[54] POWER SOURCE SWITCH FOR CAMERAS

[75] Inventors: Masaaki Nakai, Nara; Yasuzi Kogure, Hyogo; Masayoshi Sahara; Toshio Kobori, both of Osaka, all of Japan

[73] Assignee: Minolta Camera Kabushiki Kaisha, Azuchi, Japan

[*] Notice: The portion of the term of this patent subsequent to Apr. 22, 1997 has been disclaimed.

[21] Appl. No.: 941,507

[22] Filed: Sep. 11, 1978

[30] Foreign Application Priority Data

Sep. 13, 1977 [JP] Japan .................................. 52-109503

[51] Int. Cl.³ ............................................. G03B 17/38
[52] U.S. Cl. .................................. 354/266; 354/289.1
[58] Field of Search ..................... 354/60 R, 135, 266, 354/267, 289

[56] References Cited

U.S. PATENT DOCUMENTS 3,741,089 6/1973 Takada et al. ..................... 354/59

FOREIGN PATENT DOCUMENTS 2734725 2/1978 Fed. Rep. of Germany ...... 354/266

Primary Examiner—Michael L. Gellner
Attorney, Agent, or Firm—Wolder, Gross & Yavner

[57] ABSTRACT

A camera includes a manually adjustable photographic parameter such as diaphragm aperture, shutter speed, focus distance or the like and an electrically energizable network indicating the value of the adjusted parameter or a related value. The indicator network is connected through a normally open signal controlled semiconductor switch to a current source and a device is located on the manually accessible face of the photographic parameter adjusting member and is electrically connected to the switch network input and is touch responsive to produce of switch network closing signal so as to automatically energize the indicator network upon manual engagement of the adjusting member. The sensing member is alternatively a pair of spaced conductor electrodes or a piezo-electric element and the switch is respectively responsive to resistance or voltage values applied to its input. A network is provided for opening the closed switch after a predetermined period.

21 Claims, 5 Drawing Figures

POWER SOURCE SWITCH FOR CAMERAS

BACKGROUND OF THE INVENTION

The present invention relates generally to improvements in cameras with devices for electrically indicating information, and it relates more particularly to an improved power source switch device in a camera to control the power supply to an electrical indicating device.

Generally, cameras are provided with manually movable adjusting members, such as a diaphragm setting member, a shutter speed setting member, a distance setting member and a film speed setting member, for adjusting such photographic parameters and conditions as the amount of exposure and focusing. The cameras are further frequently provided with electrical indicating devices for indicating or exhibiting information on the exposure or focusing condition adjusted by any one of the adjusting members. The electrical indicating device exhibits or indicates the information, e.g. the diaphragm aperture value, shutter speed or whether the camera is so adjusted as to achieve the proper exposure at an appropriate place of the camera, e.g. in the viewfinder.

A number of power source switch devices have been proposed for controlling the power supply to the electrical indicating device. For instance, a device is known in which a switch member is provided between the indicating device and power source, and a manually operated member, such as a push button or lever, interlocked with the switch member is provided on the camera body, the switch member being opened and closed by operating the manually operated member.

With such device, however, the manually operated member must be operated without fail before the adjusting member is operated, thus rendering the camera awkward and troublesome to operate in preparation for performing photography and causing great inconvenience to the user.

Further, with such device, although the manually operated member must first be manually operated in preparation for the photography, the user who is inexperienced in the camera operation may overlook the required manual operation. This may lead to total failure in the preparatory photography operation or to an imperfect preparatory operation for performing the photography.

With such device, in addition, even if the user is familiar with the camera operation, he may fail from time to time to operate the manual operated member for closing the switch member. In such case, the user can recognize his failure to effect the manual operation by the absence of aforesaid indication, and after such recognition he may then effect the manual operation. When the switch member is closed in the above sequence, however, a considerable time is consumed in the initiation of preparatory operation for taking the photograph before which the power switch member is closed, and thus the device possesses the disadvantage that an important shutter opportunity for photographing a fast moving or continuously changing subject may be missed.

In an attempt to eliminate the above disadvantages, a device has been proposed in U.S. Pat. No. 3,741,089, issued on June 26, 1973, in which the manually operating member for closing the power switch is provided proximate to the related adjusting member.

The power source switch device disclosed by the U.S. Patent comprises a normally open switch for connecting the power source to the electrically indicating device and a manually operating member which is biased to project outside the camera body and which closes the normally open switch when depressed. The manually operated member is provided proximate to the adjusting member, such as a diaphragm setting member, and the manually operated member is depressed simultaneously with the adjusting member being touched by the user's finger when placed on the adjusting member for its manual operation.

With such a power source switch device, the manually operated member is operated in operative relation to the operation of the adjusting member, the device thus eliminating most of the aforesaid inconveniences.

With such power source switch device, however, the manually operated member may not be depressed in case the adjusting member is formed with a relatively large and wide operating portion with which the user's finger comes into contact. This results from the user's finger not protruding from the operating portion enough to depress the manually operated member when the user operates the adjusting member.

Accordingly, the above proposed power source switch device cannot be suitably employed unless the operating portion of the adjusting member is narrow so that the user's finger protrudes from the operating portion when the finger is placed thereon for moving the adjusting member. Therefore, the power source switch device disclosed by the above identified U.S. Patent cannot be employed in a camera having the comparatively large adjusting member to be operated, like the distance setting member for a single lens reflex camera.

In the device disclosed by the above identified U.S. Patent, the manually operated member is provided at a side of the adjusting member and the manually operated member is not operated when the adjusting member is operated from the other side where the manually operated member is not provided, the device thus often being inconvenient to use.

In addition, with the device disclosed by the above identified U.S. Patent, friction occurs between the manually operated member and the user's finger when the direction of the manually operated member's movement or the amount of its movement differs from that of the adjusting member, thus preventing the smooth operation of the adjusting member.

Furthermore, in the device disclosed by the above identified U.S. Patent, the manually operated member for operating the normally open switch and a spring for biasing the manually operated member to project from the camera body must be arranged within a particular space provided beside the adjusting member, and this causes an increase in the size of the camera, the device thus leading to additional inconvenience.

SUMMARY OF THE INVENTION

An object of the present invention is to provide an improved power source switch device for use in cameras provided with electrical devices for indicating or exhibiting photographic conditions or parameters adjusted by the adjusting members, and which is automatically closed when the adjusting member is manually operated to thereby energize the electrical indicating device.

A further object of the present invention is to provide an improved power source switch device adaptable to a camera having any size and shape of adjusting member.

Another object of the present invention is to provide an improved power source switch device of the above nature which closes the power switch when the adjusting member is operated from any direction.

Still another object of the present invention is to provide an improved power source switch device of the above type by which the adjusting member moves smoothly consequent to the power source switch operation without any hindrance to such movement.

A further object of the present invention is to provide an improved power source switch device of the above nature which does not increase the size of the camera.

The above and other objects of the present invention will become apparant from a reading of the following description taken in conjunction with the accompanying drawings which illustrates preferred embodiments thereof.

DETAILED DESCRIPTION OF THE PREFERRED EMBODIMENTS

Figure 1:
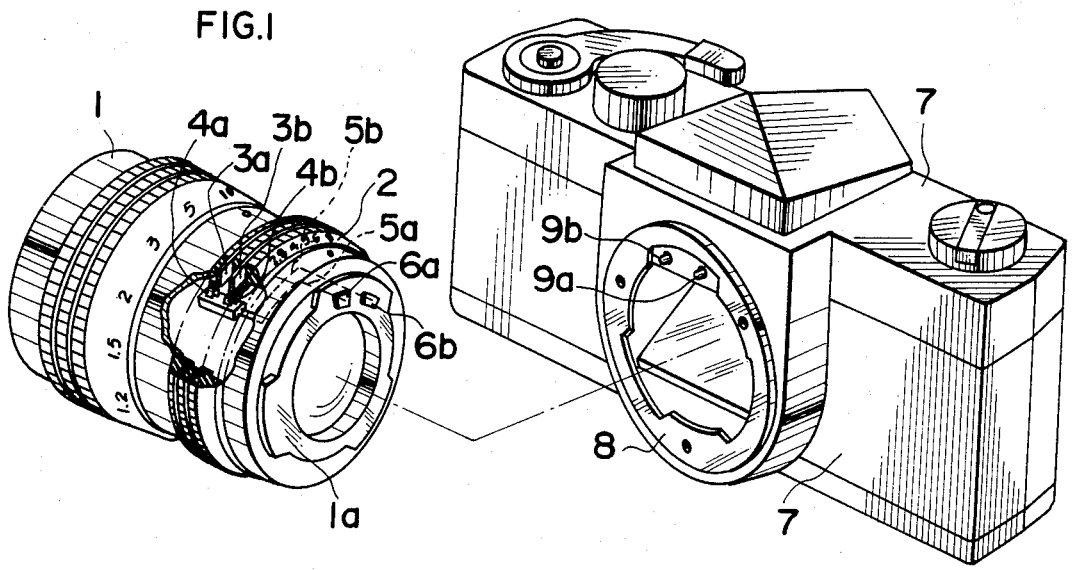
FIG. 1 is a perspective view partially in section showing a principal part of an embodiment of the present invention and the interchangeable lens detached from the camera body.
Figure 2:
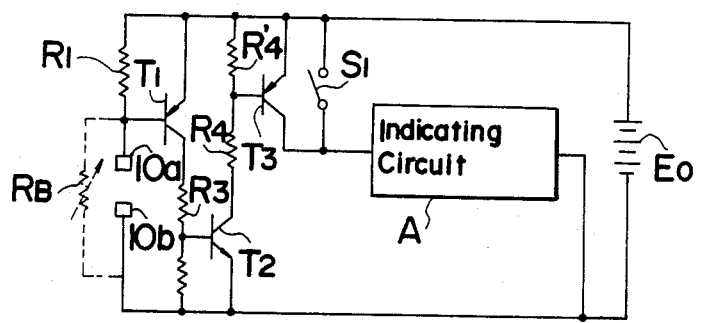
FIG. 2 is a circuit diagram of a power supply switch network associated with the embodiment shown in FIG. 1.

Referring now to the drawings, particularly FIGS. 1 and 2 thereof which illustrate a preferred embodiment of the present invention, the improved camera includes an interchangeable lens 1 which is detachably mounted on a camera body 7 by means of a coupling or mount portion 1a and a diaphragm setting ring 2 is rotatably mounted on interchangeable lens 1.

A diaphragm setting ring 2 formed of an insulating material, such as a synthetic resin and the like, is divided into three sections by two conductor rings 3a and 3b disposed independently of each other with a narrow space in between and arranged to extend in the radial direction from the lens optical axis. The conductor rings 3a and 3b are affixed to diaphragm setting ring 2 and are rotatable in relation to the operation of the diaphragm setting ring. The outer peripheries of conductor rings 3a and 3b are formed on a level with the outer surface of diaphragm setting ring 2 or projected from the outer surface of the diaphragm setting ring so that the user's finger comes into contact with the outer peripheries of conductor rings 3a and 3b when it touches the diaphragm setting ring for rotating the diaphragm setting ring.

Two sliding pieces or brushes 4a and 4b which are in slide contact or engagement with the conductor rings 3a and 3b are separately, independently fixed on a base of insulating material. The first ends of conductors 5a and 5b whose opposite second ends are connected to respective sliding pieces 4a and 4b are connected respectively to mutually insulated contact pieces 6a and 6b fixed on mount portion 1a of interchangeable lens 1.

A pair of mutually insulated contacts 9a and 9b are separately, independently fixed on camera body 7 and are arranged to engage or come into contact with contact pieces 6a and 6b, respectively, when the interchangeable lens 1 is coupled in position to camera body 7. The contacts 9a and 9b are connected to an electric circuit, as shown in FIG. 2, inside camera body 7, and when interchangeable lens 1 is coupled in place to lens mount portion 8 of camera body 7, conductor rings 3a and 3b serve as input contacts 10a and 10b to the electric circuit.

Referring to FIG. 2, which shows the power supply control or switch circuit of the present embodiment, the control input terminal or contact 10a is connected through a resistor R1 to the positive pole of an electric power source EO while a control input ground terminal or contact 10b is connected to the negative pole of power source EO. The collector of a transistor T1 whose emitter is connected to the positive pole of power source EO is connected to the negative pole of power source EO through a resistor R3. The collector of a transistor T2 is connected through series connected resistors R4' and R4 in parallel connection with transistor T1 to the positive pole of power source EO while the emitter of the transistor T2 is connected to the negative pole of power source EO.

The base of transistor T1 is connected to the contact 10a and the resistor R3 is connected between the collector of transistor T1 and the base of transistor T2.

The emitter of a transistor T3 whose base is connected to the junction of the resistors R4' and R4 is connected to the positive pole of power source EO and the collector of transistor T3 is connected through indicating circuit A to the negative pole of power source EO by way of the power input terminals to circuit A. A normally open switch S1 is connected in parallel connection with the emitter-collector of the transistor T3.

Accordingly, conductor rings 3a and 3b are electrically separated when diaphragm setting ring 2 remains untouched, and this causes contacts 10a and 10b which are connected to conductor rings by way of contacts 6a and 6b, conductors 5a and 5b and brushes 4a and 4b to be open or non-conductive and transistors T1, T2 and T3 to be blocked, with the power switch of indicating circuit A being turned off. Indicating circuit A which may be of known construction, visibly indicates photographic parameters or conditions adjusted by diaphragm setting ring 2 in the viewfinder (not shown). It is a circuit indicating the diaphragm aperture value set by the diaphragm setting ring, for example, as is well known.

When the user's finger comes into contact with the diaphragm setting ring 2 for setting the diaphragm, resistor RB is equivalently inserted between conductor rings 3a and 3b due to the conductivity of the user's finger, thus connecting contacts 10a and 10b by resistor equivalent RB and allowing base current to flow at transistor T1 which has been blocked and transistor T1 becomes on or actuated.

When transistor T1 turned on, transistors T2 and T3 are also turned on, thereby closing the power switch circuit as shown in the diagram so that the power supply circuit from power source EO to diaphragm aperture indicating circuit A is closed or completed, and the diaphragm aperture value set by means of diaphragm setting ring 2 is indicated by the thus energized diaphragm aperture indicating circuit A. The power supply continues to energize and activate the indicating circuit only while the diaphragm setting ring remains in contact with the user's finger for diaphragm setting operation.

When operating diaphragm setting ring 2 with a glove or the like worn, it is impossible to utilize the conductivity by the user's finger, and this makes the conduction of transistor T3 impossible, thus causing inconvenience in that the indicating circuit remains inoperative.

Manual switch S1 provided in parallel connection with transistor T3 serves as a safety switch to eliminate such inconvenience and is arranged to be closed by manual operation from the outside of the camera. Therefore, the user wearing a glove is able to close safety switch S1 manually to supply power to and activate the indicating circuit A.

Figure 3:
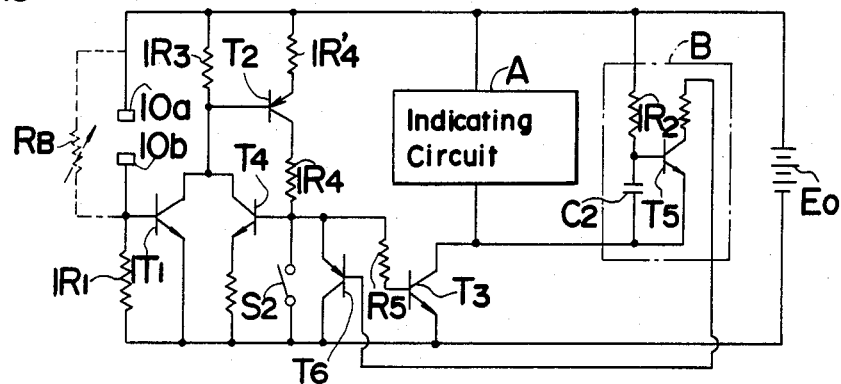
FIG. 3 is a diagram of another alternative power supply switch network which may be associated with the embodiment shown in FIG. 1.

The circuit shown in FIG. 3 is another embodiment of the power switch circuit according to the present invention in which after power supply has been applied to and activates the indicating circuit, the power supply is automatically blocked after a given lapse of time. That is, in the embodiment shown in FIG. 2, the power supply circuit is closed while in contact with the user's finger and the circuit is opened when the user's finger comes out of contact, whereas in the embodiment shown in FIG. 3, after the power supply continues for a given time (e.g. about 5 seconds), the power supply is automatically blocked, regardless of the user's finger being in contact or out of contact.

Referring to FIG. 3, resistor 1R1 is connected between contact 10b' and the negative pole of power source EO and between the base and emitter of transistor 1T1, the contact 10b' being connected to the transistor base. The collector of transistor 1T1 is connected to the base of transistor 1T2, and to the positive pole of power source EO through resistor 1R3. The emitter of the transistor 1T2 is connected through resistor 1R4' to the positive pole of power source EO. The collector and emitter of transistor T4 whose base is connected through resistor 1R4 to the collector of transistor 1T2 are connected in parallel with the transistor 1T1. The bases of transistors 1T3 and T4 are connected to each other through a resistor R5. The collector of the transistor 1T3 is connected through the diaphragm aperture indicating circuit A to the positive pole of power source EO across which indicating circuit A, a time constant circuit is connected in parallel and in series connected with transistor 1T3, the time constant circuit comprising capacitor C2 and resistor 1R2 of a timer circuit.

The collector of a transistor T5 whose base is connected to the junction of capacitor C2 and resistor 1R2 of the time constant circuit is connected through a resistor to the base of a transistor T6 and the emitter of transistor T5 is connected to the collector of the transistor 1T3. The collector of a transistor T6 is connected to the negative pole of power source EO and the emitter of the transistor T6 is connected to the base of the transistor T4. Furthermore between the negative pole of power source EO and the base of transistor T4 is connected a manual switch S2 in parallel connection with the output of transistor T6. Switch S2 is manually operative from the outside of the camera.

In the embodiment shown in FIG. 3, transistor 1T3 is normally blocked cutting off the power to and deactivating diaphragm aperture indicating circuit A. On the other hand, when the user's finger comes into contact with the diaphragm setting member, resistor equivalent RB is equivalently inserted between contacts 10a' and 10b' due to the conductivity of the human body as in the first described embodiment, thus allowing the base current to flow at transistor 1T1 which is accordingly activated or turned on. With the transistor 1T1 turned on, a voltage appears across resistor 1R3 to turn on transistor 1T2 which has been so far blocked, and the transistor 1T2 when turned on causes the base potential of transistor T4 to rise, thus turning on transistor T4. Thus, once transistor T4 is turned on to retain the voltage at resistor 1R3 even when transistor 1T1 is blocked by the user's finger coming out of contact with the diaphragm setting member, and transistor 1T2 is maintained conductive.

With transistor 1T2 turned on, a voltage appears at resistor R5, thus causing transistor 1T3 to be turned on in synchronization with transistor T4.

The turning-on of the transistor 1T3 energizes diaphragm aperture indicating circuit A and the collector current of transistor 1T3 commences charging the time constant capacitor C2 in timer circuit B. When the electric charge at capacitor C2 reaches a specific level, transistor T5 which has been blocked is now turned on. With transistor T5 turned on, transistor T6 which has been blocked is turned on, causing the base potential of transistor T4 to suddenly drop. At this time, transistor 1T2 is blocked and transistor T6 is also blocked, with power to diaphragm aperture indicating circuit A being cutt off unless the user's finger continues in contact with the diaphragm setting member.

It is to be noted that switch S2 when closed produces the same effect as the conduction of transistor T6, the switch S2 being used when the power supply to the diaphragm aperture indicating circuit A is unnecessary before the power supply to the indicating circuit is blocked by the operation of timer circuit B.

Figure 4:
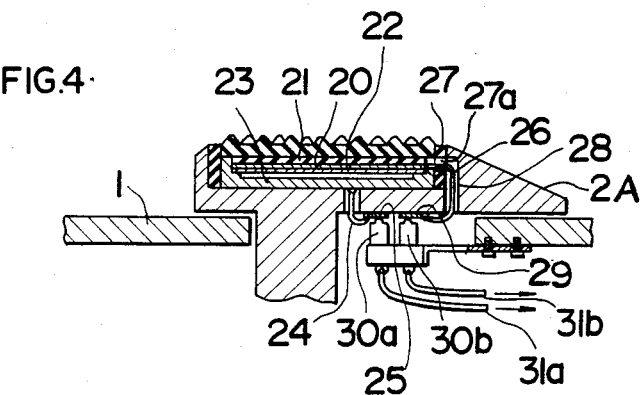
FIG. 4 is a cross-sectional view of the principal part of another embodiment of the present invention.
Figure 5:
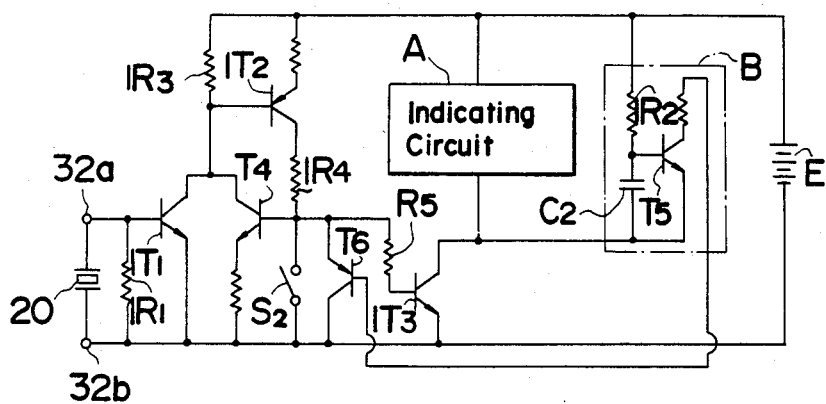
FIG. 5 is a diagram of a power supply switch network associated with the embodiment shown in FIG. 4.

The embodiments shown in FIGS. 1 through 3 employ the conductivity of the human body, whereas the embodiments shown in FIGS. 4 and 5 use transducer elements having the so-called piezo-electric effect whereby an electric force or voltage is produced when a mechanical force is externally exerted on the manually adjusting member. FIG. 4 shows a construction with a piezo-electric element arranged on diaphragm setting ring 2A, and FIG. 5 shows the power switch circuit.

Referring to FIG. 5 there is provided a piezo-electric element 20 which develops an electric charge or potential difference across its upper and lower surfaces when it is subjected to a mechanical strain by a light mechanical force externally exerted thereon. As a piezo-electric element 20, a film like the "Kureha KF Piezo Film" (the brand name in Japan) manufactured by Kureha Kagaku Kogyo Kabushiki Kaisha, of Japan, for example, may be employed. A film or membrane comprising a flexible member 21 of rubber or the like is affixed to the top surface of piezo-electric element 20, and its bottom surface is covered with a conductive material 22 comprising a conductive metal film of Aluminum or the like, the piezo-electric element 20 being formed with layers 21 and 22 into a laminated structure.

A supporting member 23 is made of conductive material and functions to support the laminated structure. A concavity is formed in the top face of the supporting member below the laminated structure to form a recess so that the laminated structure can be slightly bent. Conductive supporting member 23 is connected through a conductor 24 connected to the supporting member to a contact 25 affixed to the rear surface of diaphragm setting ring 2A. A conductor 26 electrically connected to the top surface of the piezo-electric element 20 is connected through an opening 27a formed in an insulating ring 27 of synthetic resin or the like and further along a groove 28 formed in diaphragm setting ring 2A to another contact 29 affixed to the rear surface of diaphragm setting ring 2A. Contacts 25 and 29 are ring shaped and mutually insulated and fit the inner periphery of diaphragm setting ring 2A.

Contacts 25 and 29 are connected through brushes sliding pieces 30a and 30b in slide contact or engagement with the contacts 25 and 29 similar to the embodiment shown in FIG. 1 and like in that embodiment conductors 31a and 31b are connected respectively to contacts 6a and 6b fixed on mount portion 1b of interchangeable lens 1 shown in FIG. 1. Therefore, when interchangeable lens 1 is coupled in position to camera body 7, the contacts 6a and 6b are connected to input terminals 32a and 32b of the electric circuit shown in FIG. 5, and piezo-electric element 20 is electrically connected between input terminals 32a and 32b.

In the circuit shown in FIG. 5, the circuit construction in the rear stages after transistor 1T1 is exactly the same as that shown in FIG. 3. The difference lies in that piezo-electric element 20 is connected in parallel connection with resistor R1 between the base and emitter of transistor 1T1.

The operation is now explained with emphasis on the difference in construction. In the circuit shown in FIG. 5, when the user's finger comes into contact with diaphragm setting ring 2 for the rotation thereof, piezo-electric element 20 consequent to the pressure applied thereto produces an electric force or voltage between its faces. As a result of the electric force produced by piezo-electric element 20, an electric current flows through resistor 1R1 to produce a voltage which increases the base potential of transistor 1T1 to actuate or turn on transistor 1T1 which has been open or blocked. Thus, with transistor 1T1 turned on, transistors 1T2, 1T3 and T4 are also turned on in a similar manner to those shown in FIG. 3.

In this manner, indicating circuit A is activated. In synchronization with the start of supply of power to circuit A, the collector current of transistor 1T3 starts charging time constant capacitor C2 in timer circuit B.

When the charging of the time constant capacitor C2 reaches a specific level, transistor T6 which has been blocked is turned on, thereby rapidly lowering the voltage between the base and emitter of transistor T4, which is then blocked. At this time, transistors 1T2 and 1T3 are also blocked unless an electric force is produced at piezo-electric element, thus cutting off power to indicating circuit A. Further, switch S2 functions for resetting operation in the same way as that in the circuit shown in FIG. 3.

In the embodiment shown in FIGS. 1 through 3, conductor rings 3a and 3b serving as contact members are always externally exposed outside, so that these conductor rings become shorted or conductive therebetween due to the adhesion of rainwater or sweat or conversely the rings may become electrically non-conductive. In the embodiment shown in FIGS. 4 and 5, the contact members are externally unexposed, thus completely eliminating such inconveniences. In the embodiment shown in FIGS. 4 and 5, in addition, the conductivity of the human body is not used, the embodiment thus being advantageous in that it is operative as the power switch even when the user wears gloves.

The diaphragm setting member as the adjusting member has been described for convenience. However, any manually movable members, such as a shutter speed setting member, distance setting member and film speed setting member may be substituted for the adjusting member. Further, the indicating circuit is not limited to a diaphragm aperture indicating circuit, and a variety of circuit responsive to the function of the adjusting member, e.g. those for indicating a set shutter speed and a set focal distance, may be used.

While there have been described and illustrated preferred embodiments of the present invention, it is apparent that numerous alterations, omissions and additions may be made without departing from the spirit thereof.

We claim:

1. A camera comprising:
   an adjusting member manually rotatable for adjusting a photographing parameter of the camera and having a circumferential surface engagable by a photographer's finger for rotation thereof;
   an electrically energizable indicating system for indicating information relating to the photographing parameter adjusted by said adjusting member;
   a power source for supplying energizing current to said indicating system;
   finger touch sensing means provided on around said circumferential surface engagable by the photographer's finger from any direction, said finger touch sensing means including a first and second contacting portions electrically insulated from each other; and
   a switching circuit for connecting said power source to said indicating system for controlling the current to said indicating system, said switching circuit including two terminals which are connected to said first and second contacting portions, respectively, said switching circuit being normally maintained in an open condition interrupting the current to said indicating system and being actuated in response to a conductor body such as a hand touching both said first and second contacting portions to increase the conductivity therebetween, thereby feeding energizing current to said indicating system.

2. A camera as set forth in claim 1, wherein said first and second contacting portions are relatively narrow and extend substantially parallel to each other around said circumferential surface.

3. A camera as set forth in claim 2, wherein said rotatable member includes an operating member of a substantially cylindrical shape and formed of an electrically insulating material, said manually engageable portion being defined by an outer face of said operating member, and a pair of ring members radially extending through said operating member from inside of said operating member to expose their outer surfaces and rotatable integrally with said operating member, said first and second contacting portions being formed as the outer surfaces of said ring members, and wherein said camera includes a pair of fixed contacting members insulated from each other and located inside of said operating member and engaging said respective ring members, said terminals being electrically connected to said fixed contacting members.

4. A camera as set forth in claim 1, wherein said first and second contacting portions are substantially flush with the outer surface of said adjusting member.

5. A camera as set forth in claim 1, wherein said camera includes safety switch means connected in parallel with said switching circuit and having an open condition to interrupt the current to said indicating system and a closed condition to effect the supply of current to said indicating system, said safety switch means being normally in its open condition and being transferrable to closed condition by externally manual operation.

6. A camera as set forth in claim 1, wherein said switching circuit includes means for maintaining the actuated switching circuit in actuated condition, and wherein said camera includes deactuating means connected to said switching circuit for deactuating said switching circuit independently of said conductor body being maintained both on said first and second contacting portions.

7. A camera as set forth in claim 6, wherein said deactuating means includes an RC timer circuit for controlling the time when said deactuating means deactuates said switching circuit.

8. A camera comprising:
an adjusting member manually movable for adjusting a photographing parameter of the camera and having a manually engagable portion;
an electrically energizable indicating system for indicating information relating to the photographing condition adjusted by said adjusting member;
a power source for supplying energizing current to said indicating system;
a mechanical electrical transducer element provided at said manually engageable portion of said adjusting member where it is touched by the photographer's finger when the photographer moves said adjusting member and generating an electric signal upon being subjected to mechanical pressure;
a switching circuit connecting said power source to said indicating system for controlling the energizing current to said indicating system, said switching circuit including two terminals which are electrically connected to said transducer element so as to be supplied an electric signal from said transducer element in response to a mechanical force applied thereto and maintaining means for maintaining the actuated switching circuit in actuated condition, said switching circuit being normally maintained in a deactuated relatively open condition interrupting the current to said indicating system but being actuated when an electric signal from said electric element is supplied through said terminals, thereby feeding energizing current to said indicating system.

9. A camera as set forth in claim 8 wherein said transducer element comprises a piezo-electric element.

10. A camera as set forth in claim 9, wherein said adjusting member is a rotatable member manually rotatable for adjusting said photographing condition and having a circumferential surface defining said manually engagable portion to be touched by the photographer's finger when the photographer rotates it, said piezo-electric element being disposed on said circumferential surface.

11. A camera as set forth in claim 10, wherein said piezo-electric element is of the shape of a thin sheet with its upper and lower surfaces being the opposite poles of the piezo-electric generated signal, and wherein said adjusting member has recessed portion underlying said piezo-electric element to allow the deformation of said piezo-electric element.

12. A camera as set forth in claim 11, wherein said adjusting member includes a pair of mutually insulated conductive ring members electrically connected to said respective pole surfaces and wherein said camera includes a pair of fixed contacting members insulated from each other and disposed inside of said adjusting member and in slidable contact with said conductive ring members, said terminals being electrically connected to said fixed contacting members.

13. A camera as set forth in claim 10, wherein said adjusting member includes a tube shaped cover member covering at least said piezo-electric element, said cover member being formed of an elastic, insulating material.

14. A camera as set forth in claim 10, wherein said piezo-electric element is tube shaped and surrounds said circumferential surface.

15. A camera as set forth in claim 9, wherein said camera includes deactuating means connected to said switching circuit for deactuating said switching circuit.

16. A camera as set forth in claim 15, wherein said deactuating means includes a switch member provided in said switching circuit, said switch member having an open condition and a closed condition to deactuate said switching circuit and being normally in open condition and being transferrable to closed condition by externally manual operation.

17. A camera as set forth in claim 15, wherein said deactuating means includes an RC timer circuit for controlling the time when said deactuating means deactuates said switching circuit.

18. A camera comprising:
means including a rotatable adjusting member having an external finger accessible peripheral portion for adjusting a photographic parameter of said camera;
an electrically energizable network responsive to the electrical resistance between said electrodes for providing an observable indication of said photographic parameter;
sensing means located on and extending around said peripheral portion and including first and second mutually insulated electrodes which are finger accessible at different angular positions of said adjusting member; and
a normally open switch network having a resistance responsive control input coupled between said electrodes and connecting said indicating network to said current source and being transferable to a closed condition to energize said indicating network in response to the reduction below a predetermined level of the resistance between said first and second electrodes.

19. The camera of claim 18 wherein said electrodes include circumferentially extending parallel conductor strips connected to respective terminals of switch network control input.

20. A camera comprising:
means including a rotatable adjusting member having an externally finger accessible periphery for adjusting a photographic parameter of said camera;
an electrically energizable network responsive to and for providing an observable indication of said photographic parameter;
an electric current source;

sensing means located on and extending circumferentially around said adjusting member periphery and including a mechanical electrical transducer having a voltage output responsive to finger pressure applied thereto; and a normally open switch network having a voltage responsive control input connected to said transducer output and connecting said indicating network to said current source and being transferable to a closed condition to energize said indicating network in response to a predetermined signal from said sensing means to said control input.

21. The camera of claim 20 wherein said transducer comprises a piezo-electric element.

* * * * *